Jan. 22, 1929.
B. UNDERDAHL
1,699,932
DENTAL PRESS
Filed Nov. 13, 1926
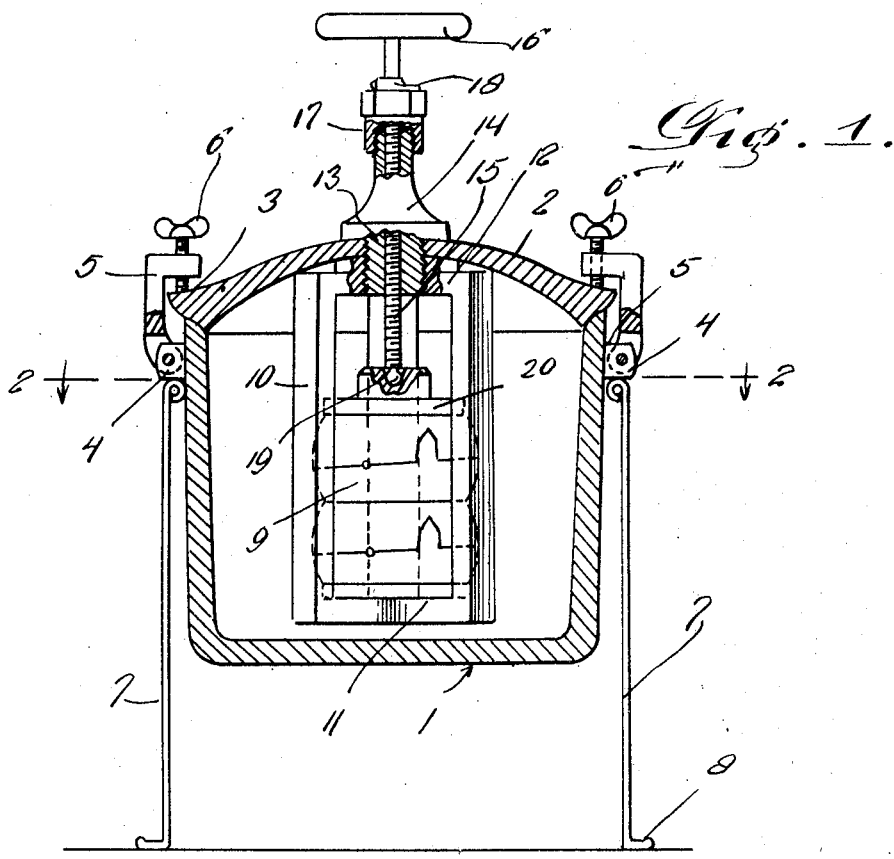
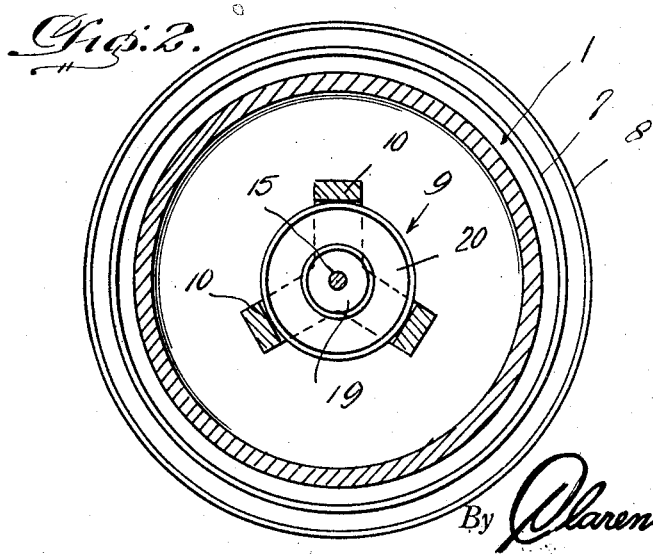
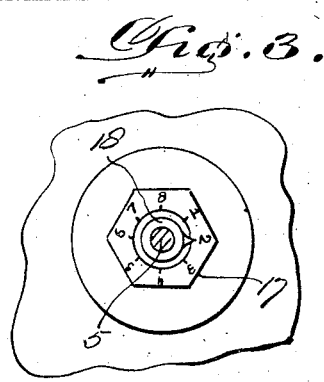
Inventor
Birger Underdahl,
By Clarence A. O'Brien
Attorney Patented Jan. 22, 1929.

1,699,932

UNITED STATES PATENT OFFICE.

BIRGER UNDERDAHL, OF PORTLAND, OREGON.

DENTAL PRESS.

Application filed November 13, 1926. Serial No. 148,170.

This invention relates to an improved device which may be referred to as a dental press, the same being constructed particularly for use by dentists for pressing pyroxyline compounds in artificial dentures.

Briefly, the invention has reference to a steam cooker, a support therefor, means in the container of the cooker for maintaining the flasks in assembled relation, and pressure producing means.

My principal aim is to provide an artificial denture press of the class described which is characterized by compactness and convenience of arrangement of parts, simplicity of construction, inexpensiveness of manufacture, and efficiency in use and operation.

Other features and advantages will become apparent from the following description and drawings.

In the accompanying drawings forming a part of this specification like numerals are employed to designate like parts throughout the same:—

Figure 1 is a sectional view of a complete press, showing the manner in which the same is used.

Fig. 2 is a horizontal section taken approximately upon the plane of the line 2—2 of Fig. 1, and Fig. 3 is an enlarged detail view of a gauge device forming a part of the invention.

Referring to the drawings in detail, the reference character 1 designates a steam generating water receptacle which is open at its top and adapted to be closed by a special cover 2. It will be noted that the uper edge of the receptacle is beveled and that the corresponding rim portion of the cover is shaped to match the same. However, the rim portion of the cover is thickened somewhat to provide an overhanging lip extension 3.

At diametrically opposite sides of the receptacle are outstanding ears 4 between which the right angle members 5 of clamping devices are pivotally supported. These devices 5 carry set screws 6 which bear upon the extending peripheral lip of the cover. A casing 7 surrounds the receptacle 1 and the ears 4 rest in notches in the upper edge of this casing. If desired, the casing may be provided at its bottom with an outstanding flange 8 forming a rest.

The casing is of any suitable construction in order to accommodate a burner (not shown) for boiling the water in the receptacle to generate steam.

The flasks or molds 9 are of ordinary construction and are arranged in superposed relation on a support which includes three vertical bars 10 connected together by spider arms 11 and 12 at their lower ends and top respectively. The top arms are provided with a screw threaded neck which is threadedly connected with the shank 13 carried by the bonnet nut 14. In this connection, it will be noticed that the body or major portion of the nut rests upon the central portion of the cover and the cover is formed with a central opening to permit passage through the same of the shank 13. The nut is formed with a central bore through which a clamping screw 15 passes. There is a hand wheel 16 on the upper end of this screw and at the point where the screw passes through the nut 14 is an appropriate stuffing box 17. In this connection, I would direct attention to the fact that the stuffing box is provided with graduations as shown in Fig. 3 and a collar 18 is mounted on the screw and is constructed with a pointer to cooperate with the graduations to show when the flasks 9 are closed.

Noting now the inner end portion of the clamping screw, it will be seen that the same has a universal connection with a socketed boss 19 formed on the center of a circular follower plate 20 which bears against the upper flask as shown in Fig. 1.

It will be noted that the supports for the flasks together with the clamping screw, etc., is removable as a unit with the cover 2. Moreover, after the flasks are arranged in superposed relation in the supporting frame, composed of the bars 10, the flasks will be properly centered in order that even pressure may be brought to bear upon them through the medium of the follower plates 20 and the clamping screw 15.

It is believed that the construction and operation of the invention will be clear to persons skilled in the art to which the invention relates. Therefore, a more lengthy description is thought unnecessary.

Minor changes coming within the field of invention claimed may be resorted to if desired.

Having thus described my invention, what I claim as new is:—

The herein described dental press comprising a casing open at its upper end, a receptacle having lateral lugs superposed on the upper end of said casing, said receptacle open at its upper end, right angle members pivotally connected to said lugs at the receptacle, clamping screws carried in said members, a cover superposed on the upper end of the receptacle and having a central aperture, a flask receiving frame arranged in the receptacle at the under side of the cover and having a threaded aperture in its upper portion, a nut disposed in the aperture of the cover, and threaded into the aperture of the upper portion of the flask receiving frame and having a comparatively large portion superimposed on the cover and also having a vertical central bore, a clamping screw disposed in said bore and connected with the follower plate, a stuffing box secured on the upper end of the nut and having graduations in a circular series on its upper end, and a radial pointer fixed to and turnable with the screw and disposed above and adapted to cooperate with said circular series of graduations.

In testimony whereof I affix my signature.

BIRGER UNDERDAHL.